United States Patent
Kuroda et al.

(10) Patent No.: US 8,469,867 B2
(45) Date of Patent: Jun. 25, 2013

(54) CHARGING MEMBER, PROCESS CARTRIDGE, AND ELECTROPHOTOGRAPHIC APPARATUS

(75) Inventors: Noriaki Kuroda, Suntou-gun (JP); Noriko Nagamine, Suntou-gun (JP); Yuya Tomomizu, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 209 days.

(21) Appl. No.: 13/106,632

(22) Filed: May 12, 2011

(65) Prior Publication Data

US 2011/0217072 A1    Sep. 8, 2011

Related U.S. Application Data

(63) Continuation of application No. PCT/JP2010/007511, filed on Dec. 24, 2010.

(30) Foreign Application Priority Data

Dec. 28, 2009  (JP) ................................. 2009-298922

(51) Int. Cl.
  *F16C 13/00*    (2006.01)
  *G03G 15/02*    (2006.01)
(52) U.S. Cl.
  USPC ................. 492/56; 492/53; 492/59; 399/176; 399/111
(58) Field of Classification Search
  USPC ................. 492/48, 49, 53, 56, 59; 399/111, 399/115, 176
  See application file for complete search history.

(56) References Cited

U.S. PATENT DOCUMENTS 5,851,657 A * 12/1998 Yasuno et al. ................. 428/332
6,096,429 A *  8/2000 Chen et al. ..................... 428/421

(Continued)

FOREIGN PATENT DOCUMENTS

JP  2001-173641 A1   6/2001
JP  2003-316110 A    11/2003

(Continued)

OTHER PUBLICATIONS

English translation of International Preliminary Report on Patentability, International Application No. PCT/JP2010/007511, Mailing Date Aug. 23, 2012.

(Continued)

*Primary Examiner* — Essama Omgba
(74) *Attorney, Agent, or Firm* — Fitzpatrick, Cella, Harper & Scinto

(57) ABSTRACT

A charging member that achieves a high level of compatibility between the suppression of the bleeding of a low-molecular weight component from its elastic layer to its surface and charging performance for an electrophotographic photosensitive member. The charging member has a substrate, an elastic layer, and a surface layer. The surface layer contains a polymer having a Si-O-Ti bond, and the polymer has a constitutional unit represented by the following general formula (1) and a constitutional unit represented by the following general formula (2).

General formula (1)

$$\left( R_1^{} - O - R_2^{} - O \atop \underset{SiO_{3/2}}{\overset{*}{|}} \quad \underset{SiO_{3/2}}{\overset{*}{|}} \right)$$

General formula (2)

$TiO_{4/2}$

7 Claims, 5 Drawing Sheets

U.S. PATENT DOCUMENTS

| | | | |
|---|---|---|---|
| 7,524,917 B2 * | 4/2009 | Ootake et al. | 528/33 |
| 7,664,434 B2 | 2/2010 | Kuroda et al. | |
| 7,693,457 B2 | 4/2010 | Kuruma et al. | |
| 7,962,068 B2 | 6/2011 | Kuroda et al. | |
| 8,064,803 B2 * | 11/2011 | Kuroda et al. | 399/176 |
| 8,092,358 B2 * | 1/2012 | Kuruma et al. | 492/53 |
| 8,227,087 B2 * | 7/2012 | Mayuzumi et al. | 428/447 |
| 8,277,947 B2 * | 10/2012 | Mayuzumi et al. | 428/447 |
| 8,383,234 B2 * | 2/2013 | Mayuzumi et al. | 428/323 |
| 8,401,425 B2 * | 3/2013 | Kuroda et al. | 399/111 |
| 2009/0067880 A1 | 3/2009 | Kuroda et al. | |
| 2009/0080933 A1 * | 3/2009 | Kuruma et al. | 399/111 |
| 2009/0238601 A1 * | 9/2009 | Kuroda et al. | 399/111 |
| 2010/0226684 A1 | 9/2010 | Mayuzumi et al. | |
| 2011/0182617 A1 | 7/2011 | Kuruma et al. | |
| 2011/0182618 A1 | 7/2011 | Kuruma et al. | |
| 2011/0217072 A1 * | 9/2011 | Kuroda et al. | 399/111 |
| 2012/0076535 A1 * | 3/2012 | Nagamine et al. | 399/111 |
| 2012/0093539 A1 * | 4/2012 | Nagamine et al. | 399/111 |
| 2012/0121296 A1 * | 5/2012 | Kuroda et al. | 399/176 |
| 2012/0134709 A1 * | 5/2012 | Kuroda et al. | 399/111 |
| 2012/0141159 A1 * | 6/2012 | Nagamine et al. | 399/111 |
| 2012/0141160 A1 * | 6/2012 | Tomomizu et al. | 399/111 |
| 2012/0141162 A1 * | 6/2012 | Mayuzumi et al. | 399/111 |
| 2012/0301180 A1 * | 11/2012 | Tomomizu et al. | 399/111 |
| 2013/0004206 A1 * | 1/2013 | Kuroda et al. | 399/176 |
| 2013/0064571 A1 * | 3/2013 | Kodama et al. | 399/111 |

FOREIGN PATENT DOCUMENTS

| | | |
|---|---|---|
| JP | 2004-37786 A | 2/2004 |
| JP | 2005-24672 A | 1/2005 |
| JP | 2006-39286 A | 2/2006 |
| JP | 2006-293004 A | 10/2006 |
| JP | 2006-293004 A1 | 10/2006 |
| JP | 2007-4102 A | 1/2007 |
| WO | 2006/070847 A1 | 7/2006 |

OTHER PUBLICATIONS

PCT International Search Report and Written Opinion of the International Searching Authority, International Application No. PCT/JP2010/007511, Mailing Date Jan. 25, 2011.

PCT International Search Report, International Application No. PCT/JP2010/007511, Mailing Date Jan. 25, 2011.

Office Action dated Nov. 1, 2012 in U.S. Appl. No. 13/345,477.

* cited by examiner

CHARGING MEMBER, PROCESS CARTRIDGE, AND ELECTROPHOTOGRAPHIC APPARATUS

CROSS-REFERENCE TO RELATED APPLICATIONS

This application is a continuation of International Application No. PCT/JP2010/007511, filed Dec. 24, 2010, which claims the benefit of Japanese Patent Application No. 2009-298922, filed Dec. 28, 2009.

BACKGROUND OF THE INVENTION

1. Field of the Invention

The present invention relates to a charging member for use in contact charging of an electrophotographic apparatus, a process cartridge, and an electrophotographic apparatus.

2. Description of the Related Art

A charging member that abuts an electrophotographic photosensitive member to charge the electrophotographic photosensitive member is generally formed so as to have a rubber-containing elastic layer in order that an abutment nip between the electrophotographic photosensitive member and the charging member may be sufficiently and uniformly secured. As such elastic layer ineluctably contains a low-molecular weight component, the low-molecular weight component may bleed toward the surface of the charging member owing to long-term use of the charging member to contaminate the surface of the electrophotographic photosensitive member. To cope with such problem, Japanese Patent Application Laid-Open No. 2001-173641 proposes a configuration in which the peripheral surface of an elastic layer is coated with an inorganic oxide coating or an inorganic-organic hybrid coating so that the bleeding of its low-molecular weight component toward the surface of a charging member may be suppressed.

By the way, in association with a recent increase in the speed of an electrophotographic image forming process, the time period for which an electrophotographic photosensitive member and a charging member contact each other has become relatively short, which is disadvantageous for stable and secure charging of the electrophotographic photosensitive member. It can be said that, under such circumstance, a charging member having a thick film, which is intended for the suppression of the bleeding of its low-molecular weight component, formed on its peripheral surface is of a disadvantageous configuration for stable and secure charging of an electrophotographic photosensitive member.

SUMMARY OF THE INVENTION

In view of the foregoing, an object of the present invention is to provide a charging member that achieves a high level of compatibility between the suppression of the bleeding of a low-molecular weight component from its elastic layer to its surface and charging performance for an electrophotographic photosensitive member. Another object of the present invention is to provide an electrophotographic image forming apparatus and a process cartridge each capable of stably forming high-quality electrophotographic images.

According to one aspect of the present invention, there is provided a charging member having a substrate, an elastic layer, and a surface layer, in which the surface layer contains a polymer having a Si—O—Ti bond, and the polymer has a constitutional unit represented by the following general formula (1) and a constitutional unit represented by the following general formula (2).

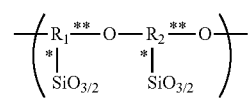

General formula (1)

General formula (2)

In the general formula (1), $R_1$ and $R_2$ each independently represent any one of the following general formulae (3) to (6).

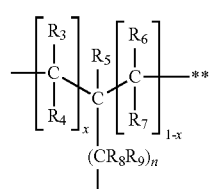

General formula (3)

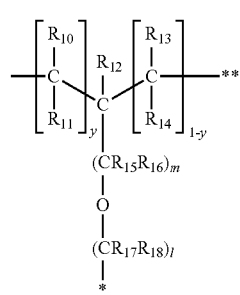

General formula (4)

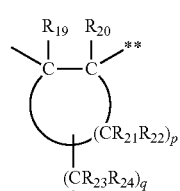

General formula (5)

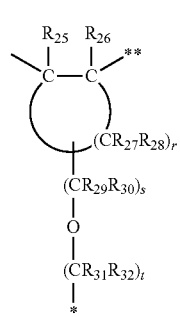

General formula (6)

In the general formulae (3) to (6); $R_3$ to $R_7$, $R_{10}$ to $R_{14}$, $R_{19}$, $R_{20}$, $R_{25}$, and $R_{26}$ each independently represent hydrogen, an alkyl group having 1 to 4 carbon atoms, a hydroxyl group, a carboxyl group, or an amino group, $R_8$, $R_9$, $R_{15}$ to $R_{18}$, $R_{23}$, $R_{24}$, and $R_{29}$ to $R_{32}$ each independently represent hydrogen or an alkyl group having 1 to 4 carbon atoms, $R_{21}$, $R_{22}$, $R_{27}$, and $R_{28}$ each independently represent hydrogen, an alkoxy group having 1 to 4 carbon atoms, or an alkyl group having 1 to 4 carbon atoms, n, m, l, q, s, and t each independently represent an integer of 1 or more and 8 or less, p and r each independently represent an integer of 4 or more and 12 or less, x and y each independently represent 0 or 1; and * and ** represent bonding positions with a silicon atom and an oxygen atom in the general formula (1), respectively.

In addition, according to another aspect of the present invention, there is provided an electrophotographic apparatus having an electrophotographic photosensitive member and the above-mentioned charging member placed to contact the electrophotographic photosensitive member.

Further, according to still another aspect of the present invention, there is provided a process cartridge having an electrophotographic photosensitive member and the above-mentioned charging member placed to contact the electrophotographic photosensitive member, the process cartridge being formed to be detachable from the main body of an electrophotographic apparatus.

According to the present invention, a charging member that achieves a high level of compatibility between the suppression of the bleeding of a low-molecular weight component from its elastic layer to its surface and excellent charging performance can be obtained. In addition, an electrophotographic apparatus and a process cartridge each capable of stably forming high-quality electrophotographic images by including the charging member can be obtained.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Figure 1:
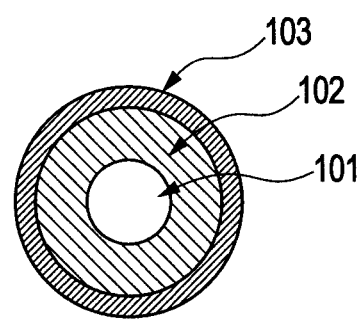
FIG. 1 is a sectional view of a charging member according to the present invention.

A charging member according to the present invention illustrated in FIG. 1 has a substrate 101, a conductive elastic layer 102, and a surface layer 103 laminated in the stated order.

Substrate

A conductive substrate made of a metal (alloy) such as iron, copper, stainless steel, aluminum, an aluminum alloy, or nickel can be used as the substrate.

Elastic Layer

One kind or two or more kinds of elastic bodies such as rubbers and thermoplastic elastomers used in the elastic layers (conductive elastic layers) of the conventional charging members can each be used as a material for forming the elastic layer. Examples of the rubbers include the following: a urethane rubber, a silicone rubber, a butadiene rubber, an isoprene rubber, a chloroprene rubber, a styrene-butadiene rubber, an ethylene-propylene rubber, a styrene-butadiene-styrene rubber, an acrylonitrile rubber, an epichlorohydrin rubber, and an alkyl ether rubber. In addition, examples of the thermoplastic elastomers include the following: a styrene-based elastomer and an olefin-based elastomer.

In addition, the elastic layer is formed so as to have predetermined conductivity by containing a conductive agent. The elastic layer has an electrical resistance of preferably $10^2 \Omega$ more and $10^8 \Omega$ or less, particularly preferably $10^3 \Omega$ or more and $10^6 \Omega$ or less. Examples of the conductive agent used in the elastic layer include a cationic surfactant, an anionic surfactant, an antistatic agent, and an electrolyte.

Examples of the cationic surfactant include the following: quaternary ammonium salts (such as lauryltrimethylammonium, stearyltrimethylammonium, octadodecyltrimethylammonium, dodecyltrimethylammonium, hexadecyltrimethylammonium, and a modified fatty acid-dimethylethylammonium), perchloric acid salts, chloric acid salts, borofluoric acid salts, ethosulfate salts, and benzyl halide salts (such as benzyl bromide salt and benzyl chloride salt). Examples of the anionic surfactant include the following: an aliphatic sulfonic acid salt, a higher alcohol sulfuric acid ester salt, a higher alcohol ethylene oxide adduct sulfuric acid ester salt, a higher alcohol phosphoric acid ester salt, and a higher alcohol ethylene oxide adduct phosphoric acid ester salt.

Examples of the antistatic agent include non-ionic antistatic agents such as a higher alcohol ethylene oxide, a polyethylene glycol fatty acid ester, and a polyhydric alcohol fatty acid ester. Examples of the electrolyte include salts (e.g., quaternary ammonium salts) of metals (such as Li, Na, and K) of the first group of the periodic table. Specific examples of the salts of metals of the first group of the periodic table include $LiCF_3SO_3$, $NaClO_4$, $LiAsF_6$, $LiBF_4$, NaSCN, KSCN, and NaCl.

Further, examples of the conductive agent for the elastic layer include salts (e.g., $Ca(ClO_4)_2$) of metals (such as Ca and Ba) of the second group of the periodic table and antistatic agents derived therefrom. Alternatively, there can be used ion-conductive conductive agents such as complexes of those conductive agents with polyhydric alcohols (such as 1,4-butanediol, ethylene glycol, polyethylene glycol, propylene glycol, and polypropylene glycol) or derivatives thereof and complexes of those conductive agents with monools (such as ethylene glycol monomethyl ether and ethylene glycol monoethyl ether).

In addition, carbon-based materials (such as conductive carbon black and graphite), metal oxides (such as tin oxide, titanium oxide, and zinc oxide), and metals (such as nickel, copper, silver, and germanium) can also be used as the conductive agent for the elastic layer.

The conductive elastic layer has an MD-1 hardness of preferably 60° or more and 85° or less, in particular, more preferably 70° or more and 80° or less from the viewpoint of the suppression of the deformation of the charging member when the charging member and an electrophotographic photosensitive member as a body to be charged are brought into abutment with each other. In addition, the elastic layer is preferably of the so-called crown shape as described below in order that the charging member may be uniformly brought into abutment with the photosensitive member in its width direction. The elastic layer of the crown shape has a larger thickness at the central portion in the width direction than a thickness at each end.

Surface Layer

A surface layer according to the present invention contains a polymer having a Si—O—Ti bond, and the polymer has a constitutional unit represented by the following general formula (1) and a constitutional unit represented by the following general formula (2).

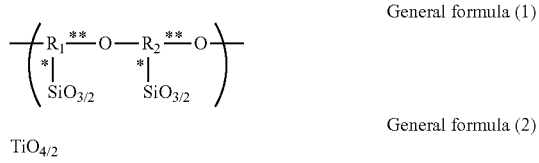

General formula (1)

General formula (2)

In the general formula (1), $R_1$ and $R_2$ each independently represent any one of the following general formulae (3) to (6).

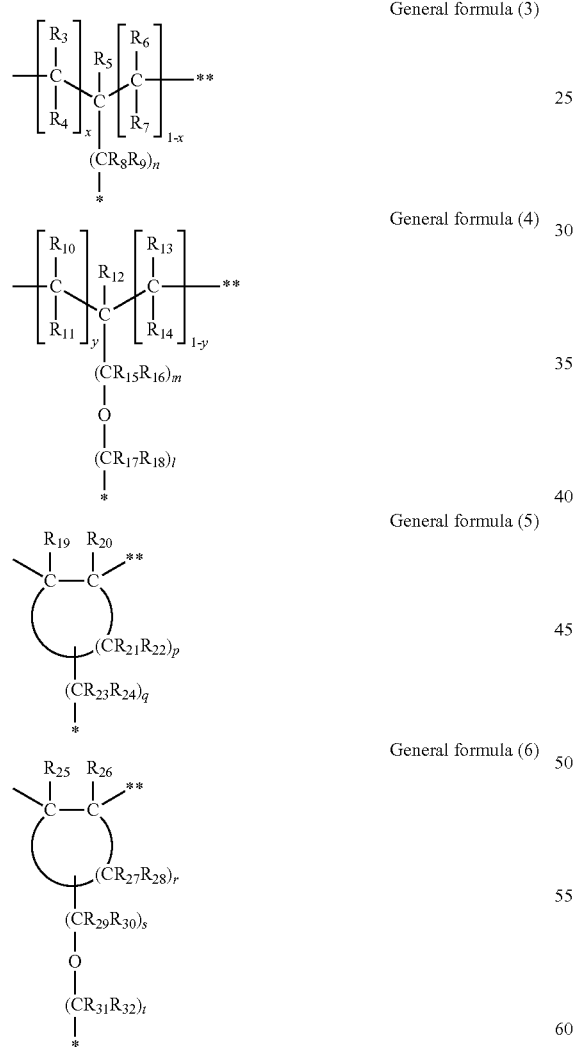

General formula (3)

General formula (4)

General formula (5)

General formula (6)

In the general formulae (3) to (6): $R_3$ to $R_7$, $R_{10}$ to $R_{14}$, $R_{19}$, $R_{20}$, $R_{25}$, and $R_{26}$ each independently represent hydrogen, a linear or branched alkyl group having 1 to 4 carbon atoms, a hydroxyl group, a carboxyl group, or an amino group; $R_8$, $R_9$, $R_{15}$ to $R_{18}$, $R_{23}$, $R_{24}$, and $R_{29}$ to $R_{32}$ each independently represent hydrogen or a linear or branched alkyl group having 1 to 4 carbon atoms; and $R_{21}$, $R_{22}$, $R_{27}$, and $R_{28}$ each independently represent hydrogen, an alkoxy group having 1 to 4 carbon atoms, or a linear or branched alkyl group having 1 to 4 carbon atoms. In addition, $CR_8R_9$, $CR_{15}R_{16}$, $CR_{17}R_{18}$, $CR_{23}R_{24}$, $CR_{29}R_{30}$, and $CR_{31}R_{32}$ may represent carbonyl groups.

$R_5$ and any one of $R_3$, $R_4$, $R_6$, and $R_7$, $R_3$ and $R_4$, $R_6$ and $R_7$, $R_5$ and carbon in $(CR_8R_9)_n$, $R_{12}$ and any one of $R_{10}$, $R_{11}$, $R_{13}$, and $R_{14}$, $R_{10}$ and $R_{11}$, $R_{13}$ and $R_{14}$, or $R_{12}$ and carbon in $(CR_{15}R_{16})_m$ may collaborate with each other to form a ring structure. n, m, l, q, s, and t each independently represent an integer of 1 or more and 8 or less. p and r each independently represent an integer of 4 or more and 12 or less. x and y each independently represent 0 or 1. Further, * and ** represent bonding positions with a silicon atom and an oxygen atom in the general formula (1), respectively.

Shown below as an example of the polymer according to the present invention is part of the structure of a polymer when $R_1$ in the general formula (1) represents a structure represented by the general formula (3) and $R_2$ in the formula represents a structure represented by the general formula (4).

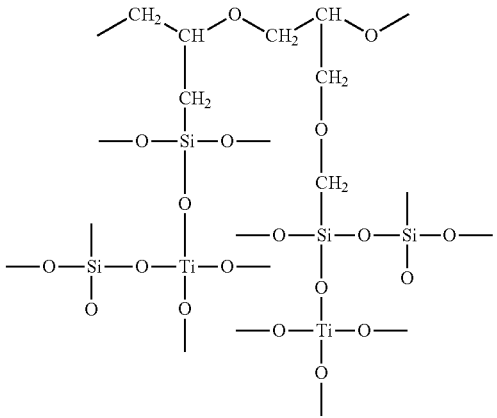

Also shown below as another example of the polymer according to the present invention is part of the structure of a polymer when $R_1$ in the general formula (1) represents a structure represented by the general formula (3) and $R_2$ in the formula represents a structure represented by the general formula (6).

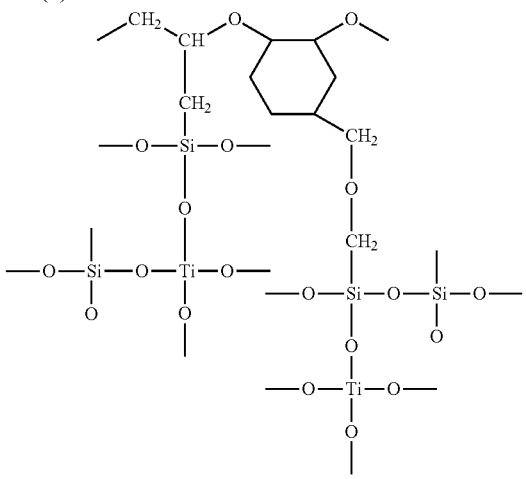

The polymer according to the present invention has a high crosslink density because the polymer has such a structure that a siloxane bond and an organic chain portion bonded to Si polymerize with each other. In addition, the polymer has an additionally increased Si condensation ratio as compared with that of a polymer produced only from a hydrolyzable silane compound because the polymer has a Si—O—Ti bond. As a result, the surface layer containing the polymer according to the present invention is dense and effective for the suppression of the bleeding of a low-molecular weight component from the conductive elastic layer.

Further, the surface layer according to the present invention has excellent charging performance enough to correspond to an increase in the speed of an electrophotographic process because the surface layer has a structure derived from a titanium compound having a high relative dielectric constant for a metal oxide. It should be noted that the charging ability of the surface layer can be adjusted by adjusting, for example, the kinds and amounts of organic chains bonded to Si atoms in the polymer according to the present invention as well as a ratio between the Ti atoms and Si atoms of the polymer.

Figure 7:
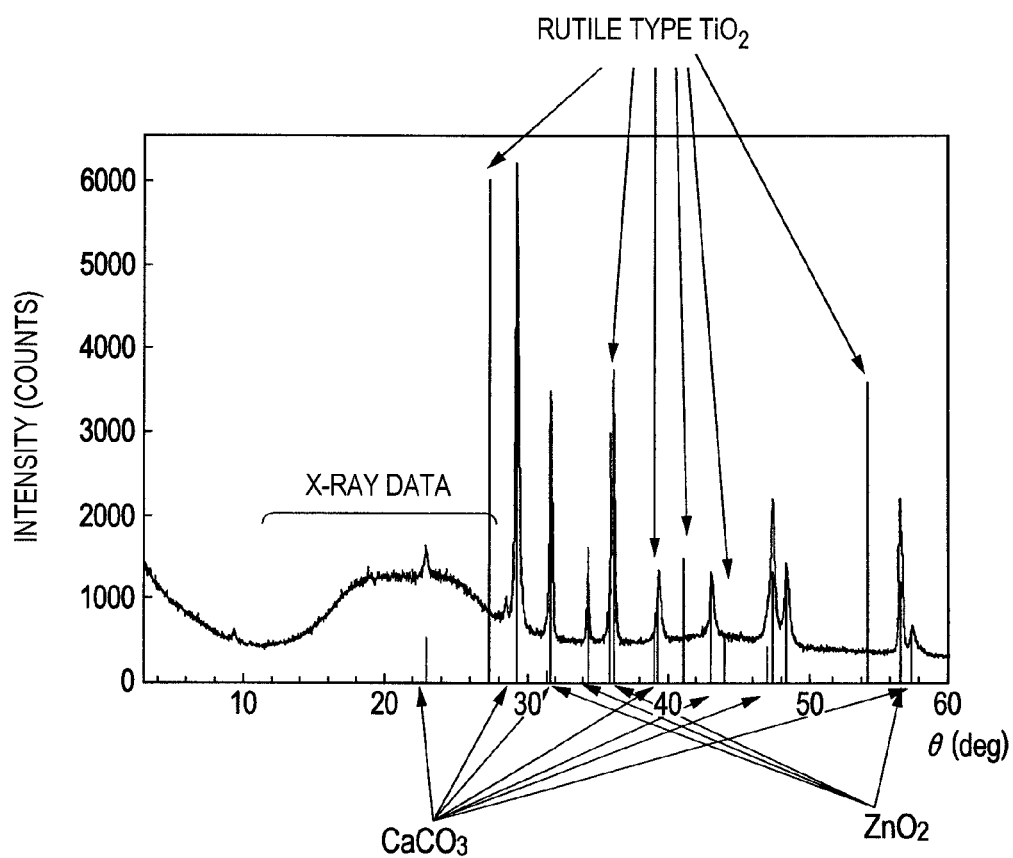
FIG. 7 is a view illustrating the result of a measurement for the surface layer of the charging member according to the present invention by XRD.

When an oxide is used as a Ti raw material for the polymer, the oxide is preferably free of any perfect crystal structure (rutile type or anatase type structure). This is because the sedimentation and agglomeration of the oxide can be easily suppressed, and a paint excellent in stability can be obtained. FIG. 7 illustrates results obtained by actually observing the surface of the charging member with an X-ray apparatus (RINT TTR II manufactured by RIGAKU). Peaks derived from $CaCO_3$ and $ZnO_2$ blended into the conductive elastic layer are observed. It should be noted that no peaks are present at peak positions derived from rutile type and anatase type crystal structures, and hence an amorphous state is found to exist.

In the polymer according to the present invention, it is preferred that $R_1$ and $R_2$ of the general formula (1) each independently represent any one selected from structures represented by the following general formulae (7) to (10). When $R_1$ and $R_2$ each represent any such structure, the surface layer can be additionally excellent in toughness and durability. In particular, a structure including an ether group represented by each of the following general formulae (8) and (10) is preferred because the adhesiveness of the surface layer for the elastic layer can be additionally improved.

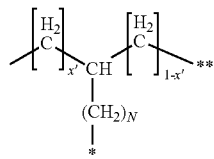

General formula (7)

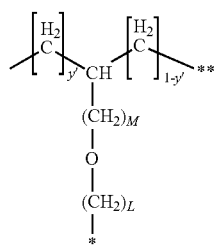

General formula (8)

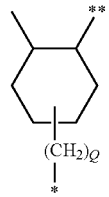

General formula (9)

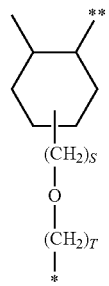

General formula (10)

In the above-mentioned general formulae (7) to (10), N, M, L, Q, S, and T each independently represent an integer of 1 or more and 8 or less, x' and y' each independently represent 0 or 1, and * and ** represent bonding positions with a silicon atom and an oxygen atom in the general formula (1), respectively.

In addition, a ratio (Ti/Si) of the number of titanium atoms to the number of silicon atoms in the polymer according to the present invention is preferably 0.1 or more and 5.0 or less. As a result, the charging ability of the charging member can be additionally improved. In addition, the polymer is preferably a crosslinked product of a hydrolyzable compound having a structure represented by the following general formula (11) and a hydrolyzable compound represented by the following general formula (12). In this case, the degrees of hydrolysis and condensation occurring between the trifunctional site of the general formula (11) and the tetrafunctional site of the general formula (12) can be controlled, and hence the physical properties of the layer such as an elastic modulus and denseness can be controlled. In addition, the use of the organic chain site represented by $R_{33}$ of the general formula (11) as a curing site enables one to control the toughness of the surface layer and the adhesiveness of the surface layer for the elastic layer. In addition, when $R_{33}$ represents an organic group having an epoxy group whose ring opens by being irradiated with ultraviolet light, a curing time can be extremely shortened unlike a conventional thermosetting material. Accordingly, the thermal degradation of the elastic layer can be suppressed.

$$R_{33}\text{—Si}(OR_{34})(OR_{35})(OR_{36}) \qquad \text{General formula (11)}$$

$$Ti(OR_{37})(OR_{38})(OR_{39})(OR_{40}) \qquad \text{General formula (12)}$$

In the general formula (11), $R_{33}$ represents any one selected from structures each having an epoxy group represented by the following general formulae (13) to (16), and $R_{34}$ to $R_{36}$ each independently represent a linear or branched alkyl group having 1 to 4 carbon atoms. In the general formula (12), $R_{37}$ to $R_{40}$ each independently represent a linear or branched alkyl group having 1 to 9 carbon atoms.

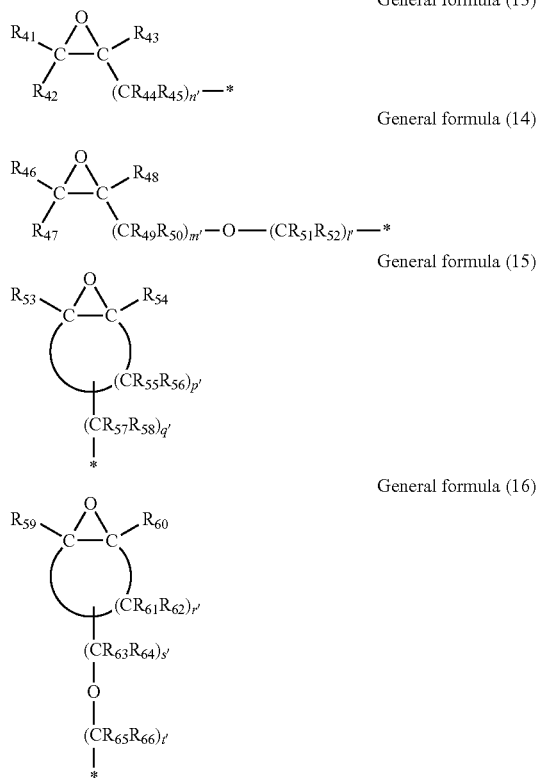

General formula (13)

General formula (14)

General formula (15)

General formula (16)

In the general formulae (13) to (16): $R_{41}$ to $R_{43}$, $R_{46}$ to $R_{48}$, $R_{53}$, $R_{54}$, $R_{59}$, and $R_{60}$ each independently represent hydrogen, a linear or branched alkyl group having 1 to 4 carbon atoms, a hydroxyl group, a carboxyl group, or an amino group; $R_{44}$, $R_{45}$, $R_{49}$ to $R_{52}$, $R_{57}$, $R_{58}$, and $R_{63}$ to $R_{66}$ each independently represent hydrogen, or a linear or branched alkyl group having 1 to 4 carbon atoms; and $R_{55}$, $R_{56}$, $R_{61}$, and $R_{62}$ each independently represent hydrogen, an alkoxyl group having 1 to 4 carbon atoms, or a linear or branched alkyl group having 1 to 4 carbon atoms. Also, in the general formulae (13) to (16): $CR_{44}R_{45}$, $CR_{49}R_{50}$, $CR_{51}R_{52}$, $CR_{57}R_{58}$, $CR_{63}R_{64}$, and $CR_{65}R_{66}$ may represent carbonyl groups; at least two of the carbon atoms in $R_{41}$, $R_{42}$, $R_{43}$, and $(CR_{44}R_{46})_{n'}$, at least two of the carbon atoms in $R_{46}$, $R_{47}$, $R_{48}$, and $(CR_{49}R_{50})_{m'}$, $R_{53}$ and $R_{54}$, or $R_{59}$ and $R_{60}$ may collaborate with each other to form a ring that leads to the formation of a cycloalkane; n', m', l', q', s', and t' each independently represent an integer of 1 or more and 8 or less; p' and r' each independently represent an integer of 4 or more and 12 or less; and * represents a bonding position with a silicon atom in the general formula (11).

The polymer according to the present invention is preferably a crosslinked product of hydrolyzable compounds represented by the general formulae (11) and (12), and a hydrolyzable compound represented by the following general formula (17). This case is preferred because the solubility and coating performance of each of the general formulae (11) and (12) at a synthesis stage, and electrical characteristics as the physical properties of the layer after its curing can be improved. In particular, the case where $R_{67}$ represents an alkyl group is preferred in terms of the improvements of the solubility and coating performance. In addition, the case where $R_{67}$ represents a phenyl group is preferred because the polymer contributes to the improvements of the electrical characteristics, in particular, a volume resistivity.

$$R_{67}\text{—Si}(OR_{68})(OR_{69})(OR_{70}) \quad \text{General formula (17)}$$

In the general formula (17), $R_{67}$ represents an alkyl group having 1 to 4 carbon atoms or a phenyl group, and $R_{68}$ to $R_{70}$ each independently represent a linear or branched alkyl group having 1 to 6 carbon atoms.

Production of Surface Layer

The polymer according to the present invention can be obtained by synthesizing a hydrolyzable condensate from the hydrolyzable compounds represented by the general formulae (11) and (12), and cleaving the epoxy group of $R_{31}$ in the hydrolyzable condensate to crosslink the hydrolyzable condensate. The polymer according to the present invention can also be obtained by synthesizing a hydrolyzable condensate from the hydrolyzable compounds represented by the general formulae (11), (12), and (17), and cleaving the epoxy group of $R_{31}$ in the hydrolyzable condensate to crosslink the hydrolyzable condensate. In addition, the charging member according to the present invention can be formed by forming a coating film of a paint containing the above-mentioned hydrolyzable condensate on the elastic layer, and then crosslinking the hydrolyzable condensate in the coating film after the formation to provide the surface layer.

Hereinafter, a method of producing the charging member involving forming the surface layer on the elastic layer is described more specifically. The polymer according to the present invention is produced through Steps (1) to (6) described below, provided that a component (A) is a hydrolyzable silane compound represented by the general formula (11), a component (B) is a hydrolyzable silane compound represented by the general formula (17), and a component (C) is a hydrolyzable titanium compound represented by the general formula (12):

Step (1): a step involving adjusting a molar ratio "(C)/{(A)+(B)}" among the components (A), (B), and (C) to 0.1 or more and 5.0 or less;

Step (2): a step involving mixing the components (A) and (B), adding water as a component (D) and an alcohol as a component (E) to the mixture, and subjecting the resultant to hydrolysis and condensation by reflux under heat;

Step (3): a step involving adding the component (C) to the solution subjected to the hydrolysis and condensation, and mixing the contents;

Step (4): a step involving adding a photopolymerization initiator as a component (F) to the mixture, and diluting the mixture with an alcohol to reduce the concentration of the mixture so that a coating agent (paint) may be obtained;

Step (5): a step involving applying the coating agent onto the elastic layer formed on the substrate; and Step (6): a step involving subjecting the hydrolyzable condensate to a crosslinking reaction to cure the coating agent.

It should be noted that the components (A), (B), and (C) may be added simultaneously in Step (2). In addition, with regard to the hydrolyzable silane compounds, only one kind of the components (A) may be used, or two or more kinds of the components (A), or two or more kinds of the components (B), may be used in combination.

Specific examples of the hydrolyzable silane compound according to the component (A) are described below.

(A-1): 4-(1,2-epoxybutyl)trimethoxysilane
(A-2): 5,6-epoxyhexyltriethoxysilane
(A-3): 8-oxirane-2-yloctyltrimethoxysilane
(A-4): 8-oxirane-2-yloctyltriethoxysilane
(A-5): 3-glycidoxypropyltrimethoxysilane
(A-6): 3-glycidoxypropyltriethoxysilane (A-7): 1-(3,4-epoxycyclohexyl)ethyltrimethoxysilane
(A-8): 1-(3,4-epoxycyclohexyl)ethyltriethoxysilane
(A-9): 3-(3,4-epoxycyclohexyl)methyloxypropyltrimethoxysilane
(A-10): 3-(3,4-epoxycyclohexyl)methyloxypropyltriethoxysilane Next, specific examples of the hydrolyzable silane compound according to the component (B) are described.
(B-1): methyltrimethoxysilane
(B-2): methyltriethoxysilane
(B-3): ethyltrimethoxysilane
(B-4): ethyltriethoxysilane
(B-5): propyltrimethoxysilane
(B-6): propyltriethoxysilane
(B-7): hexyltrimethoxysilane
(B-8): hexyltriethoxysilane
(B-9): hexyltripropoxysilane
(B-10): decyltrimethoxysilane
(B-11): decyltriethoxysilane
(B-12): phenyltrimethoxysilane
(B-13): phenyltriethoxysilane
(B-14): phenyltripropoxysilane Next, specific examples of the hydrolyzable titanium compound according to the component (C) are described.
(C-1): tetraethoxytitanium
(C-2): tetra-i-propoxytitanium
(C-3): tetra-n-butoxytitanium
(C-4): tetra-t-butoxytitanium
(C-5): 2-ethylhexoxytitanium
(C-6): 2-methoxymethyl-2-propoxytitanium The above-mentioned molar ratio "(C)/{(A)+(B)}" among the respective components is adjusted to preferably 0.1 or more and 5.0 or less, particularly preferably 0.5 or more and 4.0 or less in order that the charging ability of the charging member according to the present invention may be additionally improved. When the molar ratio exceeds 5.0, the paint (coating agent) after the synthesis becomes whitish, or a precipitate is apt to be produced in some cases. It should be noted that the molar ratio "(C)/{(A)+(B)}" means the atomic ratio "M/Si."

Water as the component (D) is added at a molar ratio "(D)/{(A)+(B)}" with respect to the components (A) and (B) of preferably 0.3 or more and 6.0 or less, more preferably 1.2 or more and 3.0 or less. As long as the molar ratio falls within the above-mentioned range, the condensation reaction progresses sufficiently. As a result, unreacted monomers hardly remain, and hence a stable paint whose characteristics hardly change over time can be produced.

There may be preferably used, as the alcohol, a primary alcohol, a secondary alcohol, a tertiary alcohol, a mixture of a primary alcohol and a secondary alcohol, or a mixture of a primary alcohol and a tertiary alcohol. A mixed liquid of ethanol, methanol, and 2-butanol, or a mixed liquid of ethanol and 2-butanol is particularly preferred. An onium salt of a Lewis acid or a Bronsted acid is preferably used as the photopolymerization initiator. Other cationic polymerization catalysts include, for example, borate salts, compounds each having an imide structure, compounds each having a triazine structure, azo compounds, and peroxides. The photopolymerization initiator is preferably diluted in a solvent such as an alcohol or a ketone in advance in order to improve compatibility with the coating agent. Methanol or methyl isobutyl ketone is preferably used as the solvent.

Of the various cationic polymerization catalysts, an aromatic sulfonium salt and an aromatic iodonium salt are preferred from the viewpoints of sensitivity, stability, and reactivity. In particular, a bis(4-tert-butylphenyl)iodonium salt, a compound having a structure represented by the following chemical formula (18) (trade name: Adekaoptomer SP150, manufactured by ADEKA CORPORATION), and a compound having a structure represented by the following chemical formula (19) (trade name: IRGACURE 261, manufactured by Ciba Specialty Chemicals Inc.) are preferred.

Chemical formula (18)

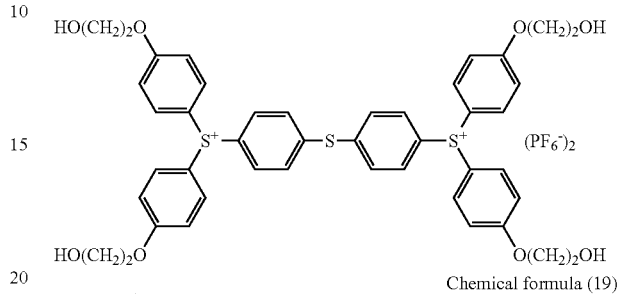

Chemical formula (19)

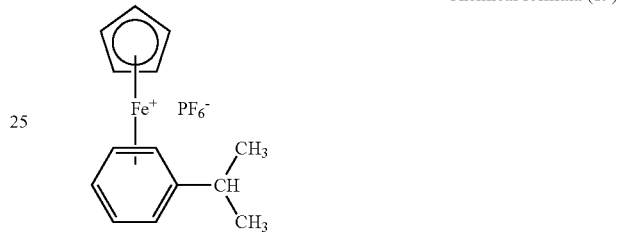

Specific examples of the solvent that can be used in the adjustment of the concentration of the coating agent in Step (4) described above are as follows: alcohols (such as ethanol, methanol, and 2-butanol) and ketones (such as ethyl acetate, methyl ethyl ketone, and methyl isobutyl ketone). The above-mentioned alcohols and ketones may be mixed before use. Of those, a mixed liquid of ethanol or methanol and 2-butanol is preferred, and a mixed liquid of ethanol and 2-butanol is more preferred.

Formation of Surface Layer

Figure 8:
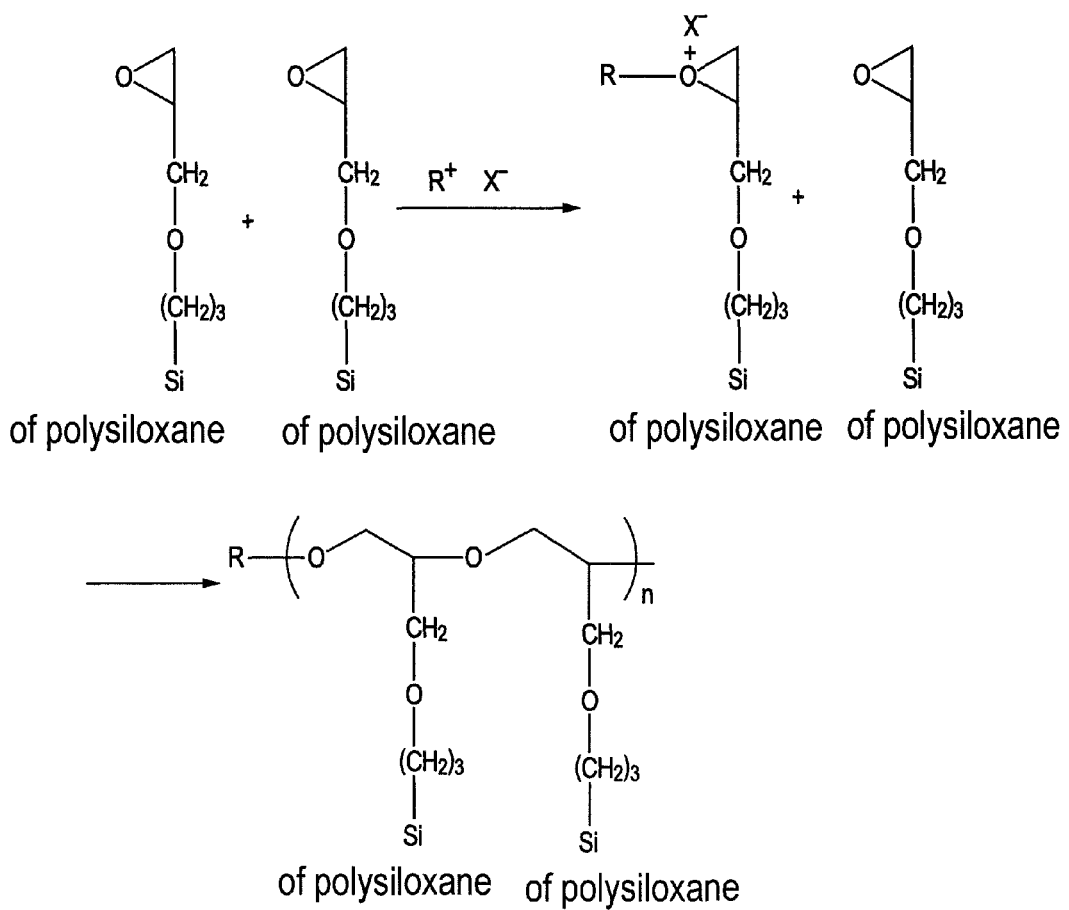
FIG. 8 is an explanatory view of a crosslinking reaction in the process of forming the surface layer according to the present invention.

The coating agent thus prepared is applied onto the conductive elastic layer by application involving the use of a roll coater, immersion application, ring application, or the like so that a layer (hereinafter referred to as "coating layer") of the coating agent may be formed. Next, the irradiation of the coating layer with an active energy ray results in the cleavage and polymerization of a group capable of cationic polymerization in the silane hydrolyzable condensate in the coating layer. As a result, the silane hydrolyzable condensate crosslink with each other to cure, and hence the surface layer is formed. The active energy ray is preferably ultraviolet light. When the surface layer is cured with ultraviolet light, excess heat is hardly generated. In addition, a wrinkle and a phase separation during the volatilization of the solvent such as heat curing hardly occur, and hence an extremely uniform film state can be obtained. As a result, a uniform and a stable potential can be provided for a photosensitive member. FIG. 8 illustrates specific examples of the crosslinking and curing reactions. That is, a condensate produced by using 3-glycidoxypropyltrimethoxysilane or 3-glycidoxypropyltriethoxysilane as the component A and by hydrolyzing the component B and the component C has a glycidoxypropyl group as the group capable of cationic polymerization. The epoxy ring of the glycidoxypropyl group of such hydrolyzable condensate opens in the presence of a cationic polymerization catalyst (represented as "$R^+X^-$" in FIG. 8), and hence the group polymerizes in a chain reaction. As a result, a polysiloxane containing $TiO_{4/2}$ and $SiO_{3/2}$ crosslink with each other to cure, and hence the surface layer is formed. In FIG. 8, n represents an integer of 1 or more.

When the environment under which the charging member is placed is an environment whose temperature and humidity change abruptly, a wrinkle or a crack may occur in the surface layer unless the surface layer sufficiently follows the expansion and contraction of the conductive elastic layer due to the changes in temperature and humidity. However, when the crosslinking reaction is performed with UV light that results in the generation of a small quantity of heat, the adhesiveness between the conductive elastic layer and the surface layer is improved, and hence the surface layer becomes able to sufficiently follow the expansion and contraction of the conductive elastic layer. Accordingly, a wrinkle or crack in the surface layer due to changes in the temperature and humidity of an environment can be suppressed. In addition, when the crosslinking reaction is performed with UV light, the deterioration of the conductive elastic layer due to thermal hysteresis can be suppressed. Accordingly, reductions in the electrical characteristics of the conductive elastic layer can also be suppressed.

A high-pressure mercury lamp, a metal halide lamp, a low-pressure mercury lamp, an excimer UV lamp, or the like can be used for the application of UV light. Of those, an UV light source rich in UV light having a wavelength of 150 nm or more and 480 nm or less is preferably used. It should be noted that the integral light quantity of UV light is defined as described below.

UV integral light quantity $[mJ/cm^2]$=UV light intensity $[mW/cm^2]$×irradiation time [s]

The integral light quantity of UV light can be adjusted depending on, for example, the irradiation time, a lamp output, and a distance between the lamp and a body to be irradiated. In addition, the integral light quantity may be provided with a gradient within the irradiation time.

When a low-pressure mercury lamp is used, the integral light quantity of UV light can be measured with a UV integral actinometer "UIT-150-A" or "UVD-S254" (trade name) manufactured by USHIO INC. Further, when an excimer UV lamp is used, the integral light quantity of UV light can be measured with a UV integral actinometer "UIT-150-A" or "VUV-S172" (trade name) manufactured by USHIO INC.

An estimated thickness of the surface layer is 10 nm or more and 100 nm or less.

Electrophotographic Apparatus and Process Cartridge

Figure 2:
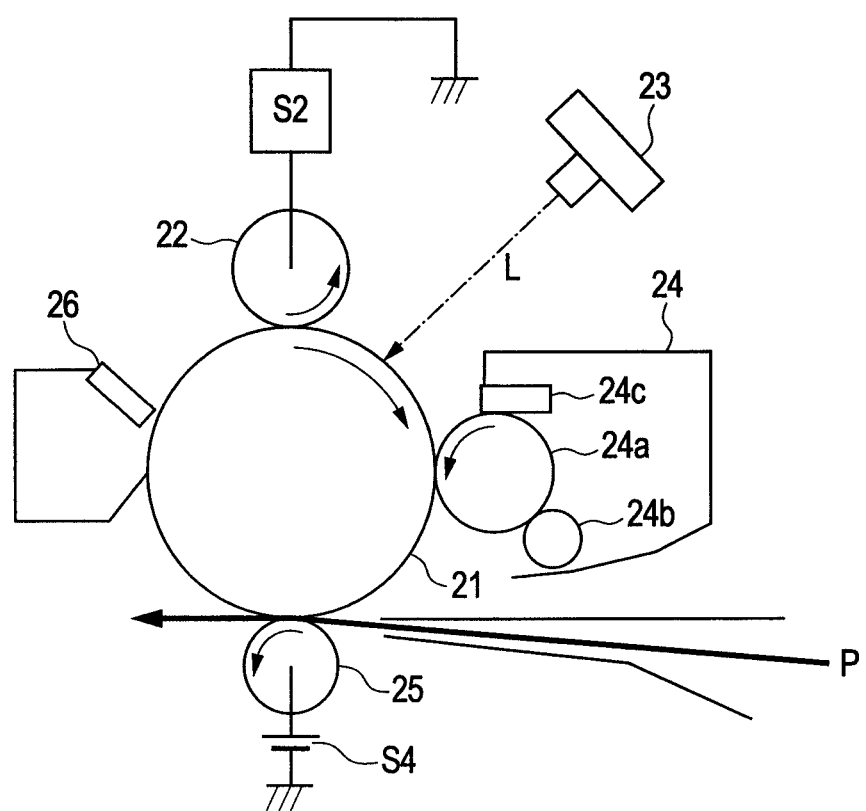
FIG. 2 is a sectional view of an electrophotographic apparatus according to the present invention.

The schematic configurations of an electrophotographic apparatus and a process cartridge in each of which the charging member of the present invention is used as a charging roller are described with reference to FIG. 2. Reference numeral 21 represents a rotating drum type electrophotographic photosensitive member (photosensitive member) as an image-bearing member. The photosensitive member 21 is rotary-driven clockwise as indicated by an arrow in the figure at a predetermined circumferential speed (process speed). For example, a known photosensitive member having at least a roll-shaped conductive substrate and a photosensitive layer containing an inorganic photosensitive material or organic photosensitive material on the substrate has only to be adopted as the photosensitive member 21. In addition, the photosensitive member 21 may further have a charge-injecting layer for charging the surface of the photosensitive member to a predetermined polarity and a predetermined potential.

A charging roller 22 and a charging bias-applying power source S2 that applies a charging bias to the charging roller 22 form a charging unit. The charging roller 22 is brought into contact with the photosensitive member 21 at a predetermined pressing force, and in this example, is rotary-driven in the forward direction with respect to the rotation of the photosensitive member 21. A predetermined DC voltage (set to −1,050 V in this example) is applied (according to a DC charging mode) from the charging bias-applying power source S2 to the charging roller 22. As a result, the surface of the photosensitive member 21 is evenly subjected to a charging treatment so as to have a predetermined polarity and a predetermined potential (a dark portion potential is set to −500 V in this example).

A known unit can be utilized as an exposing unit 23, and the unit is suitably, for example, a laser-beam scanner. Reference symbol L represents exposing light. The surface of the photosensitive member 21 subjected to the charging treatment is subjected to image exposure corresponding to target image information by the exposing unit 23. As a result, the potential of the exposure light portion of the charged surface of the photosensitive member (a light portion potential is set to −150 V in this example) selectively reduces (attenuates), and hence an electrostatic latent image is formed on the photosensitive member 21.

A known unit can be utilized as a reversal developing unit. For example, a developing unit 24 in this example has: a toner carrier 24a for carrying and conveying toner, the toner carrier being provided for the opening portion of a developer container for storing the toner; a stirring member 24b for stirring the stored toner; and a toner-regulating member 24c for regulating the amount of the toner carried by the toner carrier (toner layer thickness). The developing unit 24 selectively causes toner (negative toner) charged so as to be identical in polarity to the charged polarity of the photosensitive member 21 to adhere to the exposure light portion of the electrostatic latent image on the surface of the photosensitive member 21 to visualize the electrostatic latent image as a toner image (a developing bias is set to −400 V in this example). A known jumping development mode, contact development mode, magnetic brush mode, or the like can be employed as a development mode. In addition, the contact development mode according to which the extent to which toner scatters can be alleviated is preferably employed in an image forming apparatus that outputs color images.

For example, a transfer roller obtained by coating the top of a conductive substrate such as a metal with an elastic resin layer whose resistance is adjusted to a moderate level can be used as a transfer roller 25. The transfer roller 25 is brought into contact with the photosensitive member 21 at a predetermined pressing force, and rotates in the forward direction with respect to the rotation of the photosensitive member 21 at substantially the same circumferential speed as the rotating circumferential speed of the photosensitive member 21. In addition, a transfer voltage opposite in polarity to the charged polarity of the toner is applied from a transfer bias-applying power source S4. A transfer material P is fed into a contact portion between the photosensitive member 21 and the transfer roller from a sheet-feeding mechanism (not illustrated) at a predetermined timing, and the back surface of the transfer material P is charged so as to be opposite in polarity to the charged polarity of the toner by the transfer roller 25 to which the transfer voltage has been applied. As a result, the front surface side of the transfer material P receives the toner image of the photosensitive member 21 on the front surface side by electrostatic transfer at the contact portion between the photosensitive member 21 and the transfer roller.

The transfer material P onto which the toner image has been transferred is separated from the surface of the photosensitive member, and is then introduced into a toner image fixing unit (not illustrated) where the toner image is fixed so as to be output as an image formed product. In the case of a double image formation mode or a multiple image formation mode, the image formed product is introduced into a recirculation conveying mechanism (not illustrated), and is then reintroduced into a transfer portion. A residue on the photosensitive member 21 such as transfer residual toner is collected from the top of the photosensitive member by a cleaning unit 26 of, for example, a blade type. A process cartridge according to the present invention integrally supports the photosensitive member 21 and the charging member 22 according to the present invention placed to contact the photosensitive member 21, and is formed to be detachable from the main body of the electrophotographic apparatus.

EXAMPLES

Hereinafter, the present invention is described in more detail by way of specific examples. The term "part(s)" in the examples refers to "part(s) by mass".

Example 1

[1] Formation and Evaluation of Conductive Elastic Layer

TABLE 1

| Raw material | Usage |
|---|---|
| Moderate high nitrile NBR [trade name: Nipol DN219, central value of the amount of combined acrylonitrile: 33.5%, central value of a Mooney viscosity: 27, manufactured by Zeon Corporation] | 100 parts |
| Carbon black for coloring (filler) [trade name: #7360SB, particle diameter: 28 nm, nitrogen adsorption specific surface area: 77 $m^2$/g, DBP absorption: 87 $cm^3$/100 g, manufactured by TOKAI CARBON CO., LTD.] | 48 parts |
| Calcium carbonate (filler) [trade name: NANOX #30, manufactured by MARUO CALCIUM CO., LTD.] | 20 parts |
| Zinc oxide | 5 parts |
| Stearic acid | 1 part |

The materials shown in Table 1 above were mixed in a 6-liter pressure kneader (trade name: TD6-15MDX, manufactured by TOSHIN CO., LTD.) at a filling ratio of 70 vol % and a blade speed of 30 rpm for 24 minutes. Thus, a unvulcanized rubber composition was obtained. 4.5 Parts of tetrabenzylthiuram disulfide [trade name: Sanceler TBzTD, manufactured by SANSHIN CHEMICAL INDUSTRY CO., LTD.] as a vulcanization accelerator and 1.2 parts of sulfur as a vulcanizing agent were added to 174 parts by mass of the unvulcanized rubber composition. Then, the mixture was bilaterally cut a total of twenty times with open rolls each having a roll diameter of 12 inches at a front roll speed of 8 rpm, a back roll speed of 10 rpm, and a roll interval of 2 mm. After that, the resultant was subjected to tight milling ten times at a roll interval of 0.5 mm. Thus, a kneaded product I for a conductive elastic layer was obtained.

Next, a columnar substrate made of steel having a diameter of 6 mm and a length of 252 mm (having a nickel-plated surface) was prepared. Then, a thermosetting adhesive containing a metal and a rubber (trade name: METALOC U-20, manufactured by TOYO KAGAKU KENKYUSHO CO., LTD.) was applied to a region extending by up to 115.5 mm on both sides each with respect to the center in the axial direction of the columnar surface of the substrate (region having a total width in the axial direction of 231 mm). The resultant was dried at 80° C. for 30 minutes, and was then further dried at 120° C. for 1 hour.

Next, the kneaded product I was coaxially extruded into a cylindrical shape having an outer diameter of 8.75 to 8.90 mm with a crosshead extruder onto the above-mentioned substrate with an adhesive layer, and then its ends were cut. Thus, a conductive elastic roller in which an unvulcanized conductive elastic layer was laminated on the outer periphery of the substrate was produced. An extruder having a cylinder diameter of 70 mm ($\phi$70) and an L/D of 20 was used as the extruder. With regard to temperature regulation at the time of the extrusion, the temperature of a head was set to 90° C., the temperature of the cylinder was set to 90° C., and the temperature of a screw was set to 90° C.

Next, the above-mentioned roller was vulcanized with a continuous heating furnace having two zones set to different temperatures. The roller was passed through a first zone whose temperature had been set to 80° C. in 30 minutes, and was then passed through a second zone whose temperature had been set to 160° C. in 30 minutes. Thus, a vulcanized conductive elastic roller was obtained. Next, both ends of the conductive elastic layer portion (rubber portion) of the conductive elastic roller before surface grinding were cut so that the conductive elastic layer portion had a width in an axial direction of 232 mm. After that, the surface of the conductive elastic layer portion was ground with a rotary grindstone (number of revolutions of a workpiece: 333 rpm, number of revolutions of the grindstone: 2,080 rpm, grinding time: 12 seconds). Thus, a conductive elastic roller 1 (conductive elastic roller after surface grinding) was obtained. The conductive elastic roller 1 was of a crown shape having a diameter at each end of 8.26 mm and a diameter at the central portion of 8.50 mm, and its surface had a ten-point average roughness (Rx) of 5.5 μm, a runout of 18 μm, and a hardness of 73° (MD-1).

The ten-point average roughness (Rz) was measured in conformity with JIS B 0601 (1994). The runout was measured with a high-accuracy laser measuring machine (trade name: LSM-430v, manufactured by Mitutoyo Corporation). Specifically, outer diameters were measured with the measuring machine, and then a difference between the maximum outer diameter and the minimum outer diameter was defined as an outer diameter difference runout. The measurement was performed at five points, and then the average of the outer diameter difference runouts at the five points was defined as the runout of the product subjected to the measurement. The MD-1 hardness was measured under a measurement environment having a temperature of 25° C. and a humidity of 55% RH by bringing the indenter point of an MD-1 type hardness meter (manufactured by Kobunshi Keiki Co., Ltd.) into abutment with the surface of the conductive elastic roller 1 as a measuring object.

[2] Production and Evaluation of Condensate

Next, a polymer for a surface layer was synthesized.
(Synthesis-1)

First, components shown in Table 2 below were mixed, and then the mixture was stirred at room temperature for 30 minutes.

TABLE 2

| Raw material | Usage |
|---|---|
| Glycidoxypropyltrimethoxysilane (GPTMS, hereinafter abbreviated as "EP-1") (hydrolyzable silane compound) [trade name: KBM-403, manufactured by Shin-Etsu Chemical Co., Ltd.] | 11.56 g (0.049 mol) |

TABLE 2-continued

| Raw material | Usage |
| --- | --- |
| Hexyltrimethoxysilane (HeTMS, represented as "He" in Table 1) (hydrolyzable silane compound) [trade name: KBM-3063, manufactured by Shin-Etsu Chemical Co., Ltd.] | 62.11 g (0.301 mol) |
| Ion-exchanged water | 11.34 g |
| Ethanol [KISHIDA CHEMICAL Co., Ltd., reagent grade] | 91.87 g |

Subsequently, the mixed components were refluxed under heat with an oil bath at 120° C. for 20 hours so as to be subjected to a reaction. Thus, a condensate intermediate-I was obtained. The condensate intermediate-I had a theoretical solid content (mass ratio of a polysiloxane polymerized product to the total mass of the solution when all hydrolyzable silane compounds were assumed to be subjected to dehydration condensation) of 28.0 mass %. In addition, a molar ratio "(D)/{(A)+(B)}" of ion-exchanged water to the hydrolyzable silane compounds in this case was 1.8. Next, 9.41 g (0.331 mol) of titanium i-propoxide ((hydrolyzable titanium compound), manufactured by Kojundo Chemical Laboratory Co., Ltd., hereinafter referred to as "Ti-1") is added to 167.39 g of the condensate intermediate-I cooled to room temperature, and then the mixture was stirred at room temperature for 3 hours. Thus, a final condensate 1 was obtained. The series of stirrings was performed at 750 rpm. A ratio Ti/Si was 0.10.

Evaluation [1]: Evaluation of Condensate for Liquid External Appearance

The condensate 1 was evaluated for its liquid external appearances immediately after its synthesis and after a lapse of two weeks from the synthesis on the basis of the following criteria.

A: The liquid is in such a state as to neither become whitish nor produce a precipitate even after having been left to stand for one month.
B: The liquid is in such a state as to tend to become whitish after a lapse of about two weeks.
C: The liquid is in such a state as to tend to become whitish after a lapse of about one week.
D: The liquid is in such a state as to become whitish and to produce a precipitate at the time of the synthesis.

[3] Formation and Evaluation of Surface Layer

First, a method of producing a paint for the formation of a surface layer is described. Added to 25 g of the condensate 1 was 0.7 g of a solution prepared by diluting an aromatic sulfonium salt [trade name: Adekaoptomer SP-150, manufactured by ADEKA CORPORATION] as a photocationic polymerization initiator with methanol so as to have a concentration of 10 mass %. Thus, a condensate 1-2 (raw material for a coating agent) was obtained. Next, the condensate 1-2 was diluted with a mixed liquid of ethanol and 2-butanol (ethanol: 2-butanol=1:1) so that the resultant had a solid content of 3.0 mass %. Thus, a paint-1 for the formation of a surface layer was prepared.

Subsequently, a charging roller 1 was produced with the paint-1 by the following method. First, the paint-1 was applied onto the conductive elastic layer of the conductive elastic roller 1 (conductive elastic roller after surface grinding) by ring application (discharge amount: 0.120 ml/s, speed of a ring portion: 85 mm/s, total discharge amount: 0.130 ml). The resultant was irradiated with ultraviolet light having a wavelength of 254 nm so that an integral light quantity was 9,000 mJ/cm$^2$. Thus, the coating film of the paint-1 was cured (curing by a crosslinking reaction). In this way, a surface layer was formed. A low-pressure mercury lamp [manufactured by HARISON TOSHIBA LIGHTING Corporation] was used for the application of ultraviolet light. The following respective evaluations [2] to [7] were performed with the charging roller 1 thus obtained.

Evaluation [2]: Evaluation of Cured Product for Chemical Structure

Figure 3:
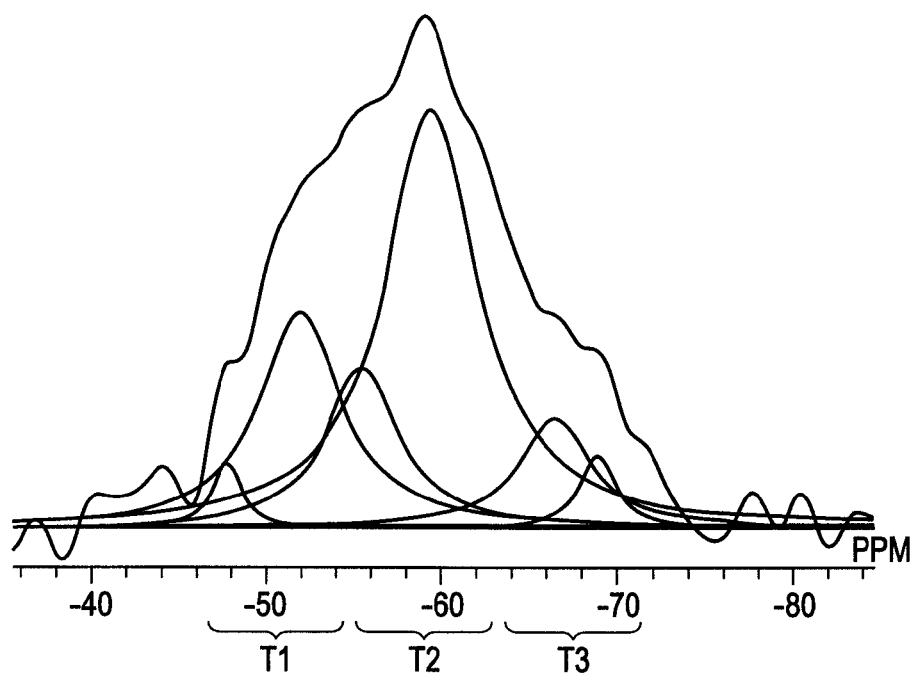
FIG. 3 is a view illustrating the results of a $^{29}$Si-NMR measurement for a surface layer composition according to the present invention.
Figure 4:
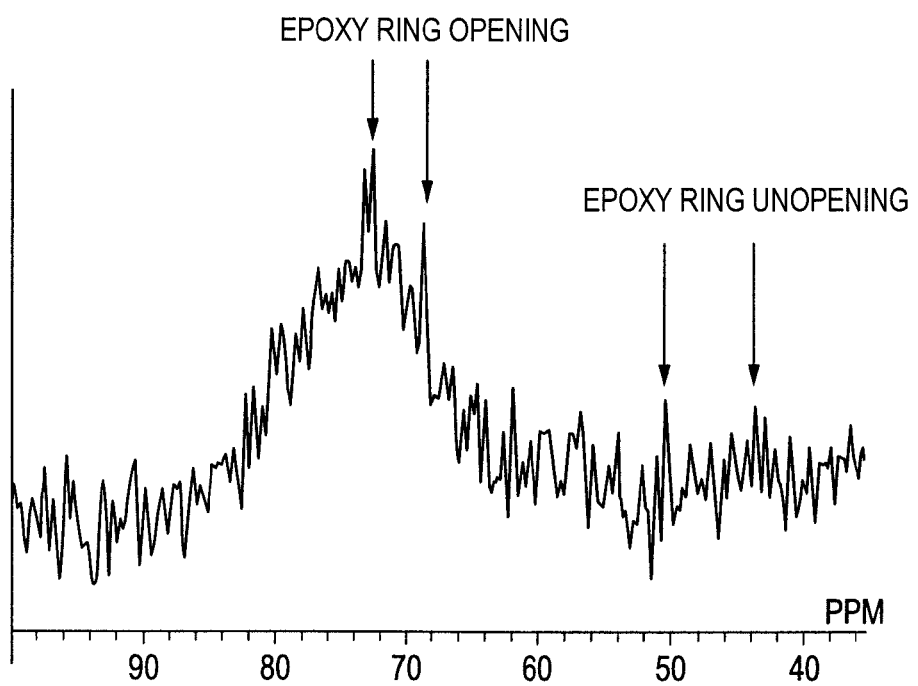
FIG. 4 is a view illustrating the result of a $^{13}$C-NMR measurement for the surface layer composition according to the present invention.

Next, it was confirmed by employing $^{29}$Si-NMR and $^{13}$C-NMR measurements that the cured product obtained by crosslinking the above-mentioned condensate 1 through the application of ultraviolet light (UV) had a structure represented by the general formula (1) [apparatus used: JMN-EX400 (trade name), JEOL Ltd.]. FIGS. 3 and 4 show the results of the measurements. The measurement procedure of each of both the $^{29}$Si-NMR and $^{13}$C-NMR measurements is as described below. First, the condensate 1 was formed into a film on an aluminum sheet, and was then irradiated with UV so as to cure. The cured product was peeled from the aluminum sheet, and was then pulverized. The pulverized product was used as a sample for an NMR measurement. FIG. 3 illustrates the results of the $^{29}$Si-NMR measurement where T1 represents —SiO$_{1/2}$(OR)$_2$, T2 represents —SiO$_{2/2}$(OR), and T3 represents —SiO$_{3/2}$. It was confirmed from the presence of T3 that a hydrolyzable silane compound having an organic chain including an epoxy group was condensed and some species existed in —SiO$_{3/2}$ states. In FIG. 4, it was confirmed by $^{13}$C-NMR that all epoxy groups polymerized without remaining. In view of the foregoing, it was confirmed that the cured product of the condensate 1 had a structure represented by the general formula (1) according to the present invention.

Evaluation [3]: Evaluation of Charging Roller

The surface of the charging roller was visually evaluated for its external appearance state on the basis of the following criteria.

A: The surface of the charging roller is completely free of any coating failure.
B: A coating failure occurred in part of the surface of the charging roller.
C: A coating failure occurred in the entire region of the surface of the charging roller.

Evaluation [4]: Observation of Si—O—Ti Bond

Figure 5:
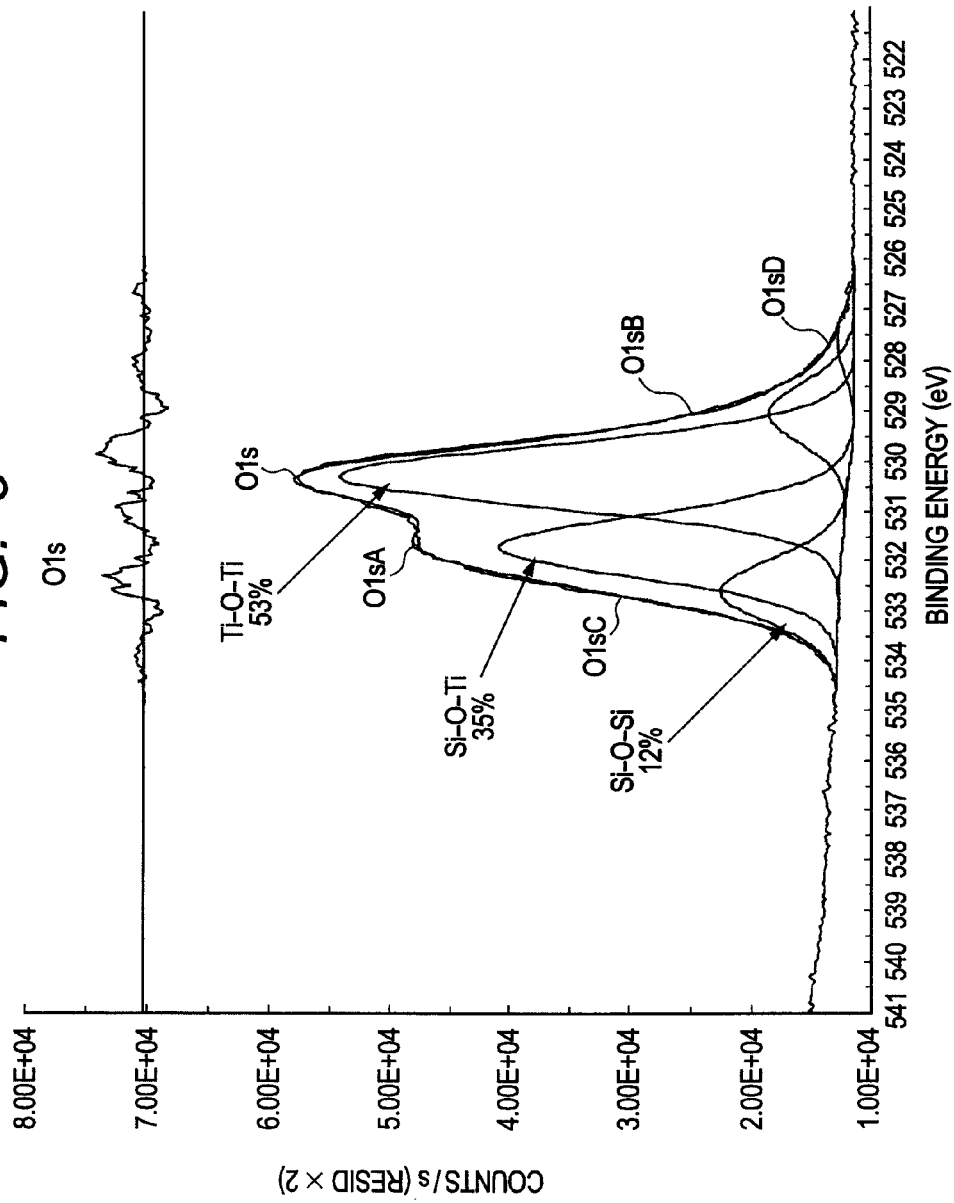
FIG. 5 is a view illustrating the results of a measurement for the surface layer of the charging member according to the present invention by ESCA.

Subsequently, the presence of a Si—O—Ti bond in the surface layer of the charging roller was confirmed by ESCA (apparatus used: Quantum 2000 (trade name), manufactured by ULVAC-PHI, Inc). A bonding mode in the surface layer was evaluated by irradiating the surface of the roller with X-ray. FIG. 5 shows the results of the measurement. The presence of a Si—O—Ti bond was confirmed by a detected O1s spectrum.

Evaluation [5]: Evaluation of Photosensitive Member for Contamination

The charging roller was mounted on a process cartridge (trade name: CRG-318BLK, manufactured by Canon Inc.) for use in a laser-beam printer (trade name: LBP7200C, manufactured by Canon Inc.), and was then left to stand under a high-temperature and high-humidity environment (having a temperature of 40° C. and a relative humidity of 95%) for one month. An abutting portion between the charging roller and a photosensitive member was observed with an optical microscope, and an examination was conducted on the presence or absence of anomalies (cracking and discoloration) due to the abutment of the charging roller. The result of the observation of the surface of the photosensitive member with the microscope was evaluated on the basis of the following criteria. Table 4 shows the results of the evaluation.

A: The surface shows no changes.
B: No problems arise on an image, but a trace amount of deposit is observed on the surface.
C: No problems arise on an image, but a large amount of deposit is observed on the surface.
D: The cracking of the surface is observed.

Evaluation [6]: Evaluation for Charging Ability

Figure 6:
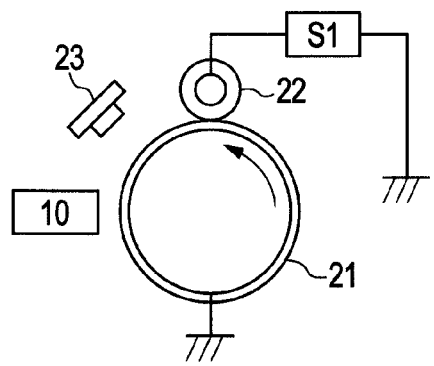
FIG. 6 is a schematic view of an apparatus for measuring the surface potential of a photosensitive drum.

An apparatus illustrated in FIG. 6 was used in an evaluation for a charging ability with respect to a process speed. The surface potential of a photosensitive drum was measured with a surface potentiometer 10 by: applying a predetermined charging bias from the charging bias-applying power source S1 to the charging member 22 contacting the photosensitive member 21; and subjecting the photosensitive member 21 to image exposure from the exposing unit 23. In this case, the number of revolutions of the photosensitive member 21 was changed, and the process speed was changed to any one of a low speed (73.5 mm/sec), a moderate speed (115.5 mm/sec), and a high speed (173.5 mm/sec). In addition, $\Delta$Vd obtained by subtracting a drum potential at the high speed from a drum potential at the low speed was used as an indicator for the charging ability.

It should be noted that a photosensitive drum mounted on a process cartridge (trade name: CRG-318BLK, manufactured by Canon Inc.) was used as the photosensitive member. Evaluation criteria for $\Delta$Vd are as described below.

AA: $0 \leq \Delta Vd \leq 3$ V
A: $3 < \Delta Vd \leq 6$ V
B: $6 < \Delta Vd \leq 9$ V
C: $9 < \Delta Vd \leq 15$ V
D: $15 < \Delta Vd$ Evaluation [7]: Evaluation for Positive Ghost The charging roller was built in a process cartridge, and then electrophotographic images were formed by mounting the process cartridge on each of three kinds of electrophotographic image forming apparatuses having different process speeds. After that, the images were evaluated for a situation in, and the extent to, which a positive ghost occurred. Here, a laser-beam printer [trade name: LBP5050, manufactured by Canon Inc.] (73.5 mm/sec at the time of monochromatic printing) for longitudinally outputting A4 paper was used as the electrophotographic image (hereinafter abbreviated as "low-speed apparatus") forming apparatus having a low process speed. In addition, a laser-beam printer [trade name: LBP7200C, manufactured by Canon Inc.] (115.5 mm/sec) for longitudinally outputting A4 paper was used as the electrophotographic image (hereinafter abbreviated as "moderate-speed apparatus") forming apparatus having a moderate process speed. Further, an apparatus obtained by reconstructing a laser-beam printer [trade name: LBP7200C, manufactured by Canon Inc.] for longitudinally outputting A4 paper so as to be capable of outputting 30 sheets per minute (ppm) (173.3 mm/sec) was used as the electrophotographic image (hereinafter abbreviated as "high-speed apparatus") forming apparatus having a high process speed. First, electrophotographic images for positive ghost evaluation were formed with the respective electrophotographic image forming apparatuses. An about 2 cm square solid black image (exposure portion) was recorded as an electrophotographic image for positive ghost evaluation on the first turn of a drum, and a halftone, uniform image was recorded as an image to be recorded on the second turn of the drum. The images were defined as images for positive ghost evaluation at an initial stage. Next, an image in which the pattern of an alphabet letter "E" was formed was continuously output with the respective electrophotographic image forming apparatuses at a print percentage of 1% on 3,000 sheets, 9,000 sheets, and 15,000 sheets of A4-sized paper for the low-speed apparatus, the moderate-speed apparatus, and the high-speed apparatus, respectively. After that, electrophotographic images for positive ghost evaluation were formed again with the respective electrophotographic image forming apparatuses. The images were defined as images for positive ghost evaluation after endurance. It should be noted that the electrophotographic images involved in positive ghost evaluation were output at a low temperature and a low humidity (temperature: 15° C./humidity: 10% RH).

The images for positive ghost evaluation at an initial stage and after endurance produced as described above were evaluated on the basis of the following criteria. Table 4 shows the results.

AA: No positive ghost can be observed.
A: An extremely pale positive ghost can be observed.
B: A slight contour of a positive ghost can be observed.
C: A slight contour of a positive ghost can be observed, and the image density of the site where the ghost occurs is somewhat high.
D: The contour of a positive ghost can be clearly observed, and the image density of the site where the ghost occurs is high.
E: A positive ghost can be observed in an extremely clear fashion.

Example 2 to Example 25

Compounds having chemical structures shown in Table 5 were used as a hydrolyzable silane compound and a hydrolyzable titanium compound, and their blending amounts were changed to values described in Table 3. Condensates (polymers) were synthesized (Syntheses-1 to 7), coating agents were prepared (coating agents-1 to 13), and furthermore, charging rollers 2 to 25 were produced in the same manner as in Example 1 except the foregoing. A ratio Ti/Si at the time of the synthesis is represented as "M/Si" in Table 3. In addition, Table 4 shows the results of the respective evaluations. It should be noted that the presence of each of a structure represented by the general formula (1) and a Si—O—Ti bond was confirmed as in the case of Example 1.

Comparative Examples 1 to 3

Condensates were synthesized, coating agents were prepared, and furthermore, charging rollers 26 to 28 were produced in the same manner as in Example 1 except that no hydrolyzable titanium compound was used. Then, the evaluations were performed. Table 7 shows the results of the evaluations.

Comparative Example 4

A hydrolyzable titanium compound, water, and ethanol were mixed according to the composition described in Table 6, and then the mixture was stirred at room temperature for 3 hours. However, no evaluations could be performed because the mixture became whitish and produced a precipitate.

TABLE 3

| | Epoxy-Si | | | | Other Si | | | | Condensate intermediate | | Ti | | | | Coating |
|---|---|---|---|---|---|---|---|---|---|---|---|---|---|---|---|
| | EP-1 | EP-2 | EP-3 | EP-4 | He | Ph | Water | EtOH | Kind | Usage | Ti-1 | Ti-2 | Ti-3 | M/Si | agent |
| Example 1 | 11.56 | | | | 62.11 | | 11.34 | 91.87 | Synthesis-1 | 167.39 | 9.41 | | | 0.10 | Coating agent-1 |
| Example 2 | | | | | | | | | | 167.39 | 9.41 | | | 0.10 | |
| Example 3 | | | | | | | | | | 167.39 | 9.41 | | | 0.10 | |
| Example 4 | | | | | | | | | | 137.99 | 38.81 | | | 0.50 | Coating agent-2 |
| Example 5 | | | | | | | | | | 137.99 | 38.81 | | | 0.50 | |
| Example 6 | | | | | | | | | | 137.99 | 38.81 | | | 0.50 | |
| Example 7 | | | | | | | | | | 46.38 | 130.42 | | | 5.00 | Coating agent-3 |
| Example 8 | | | | | | | | | | 46.38 | 130.42 | | | 5.00 | |
| Example 9 | | | | | | | | | | 46.38 | 130.42 | | | 5.00 | |
| Example 10 | | | | | | | | | | 171.96 | 4.84 | | | 0.05 | Coating agent-4 |
| Example 11 | | | | | | | | | | 113.16 | 63.64 | | | 1.00 | Coating agent-2 |
| Example 12 | | | | | | | | | | 42.21 | 134.59 | | | 5.67 | Coating agent-5 |
| Example 13 | | | | | | | | | | 171.96 | 4.84 | | | 0.05 | Coating agent-4 |
| Example 14 | | | | | | | | | | 42.21 | 134.59 | | | 5.67 | Coating agent-5 |
| Example 15 | | | | | | | | | | 171.96 | 4.84 | | | 0.05 | Coating agent-4 |
| Example 16 | | | | | | | | | | 113.16 | 63.64 | | | 1.00 | Coating agent-2 |
| Example 17 | | | | | | | | | | 42.21 | 134.59 | | | 5.67 | Coating agent-5 |
| Example 18 | 38.35 | | | | 33.53 | | 10.53 | 94.22 | Synthesis-2 | 68.82 | 107.98 | | | 2.50 | Coating agent-6 |
| Example 19 | 11.85 | | | | 31.82 | 37.07 | 11.62 | 84.48 | Synthesis-3 | 89.04 | 87.76 | | | 3.00 | Coating agent-7 |
| Example 20 | 69.97 | | | | | | 9.61 | 97.26 | Synthesis-4 | 72.76 | 104.04 | | | 3.00 | Coating agent-8 |
| Example 21 | 0.00 | 77.18 | | | | | 13.02 | 86.38 | Synthesis-5 | 60.11 | 116.69 | | | 3.00 | Coating agent-9 |
| Example 22 | | | 75.97 | | | | 7.73 | 93.07 | Synthesis-6 | 82.21 | 94.59 | | | 3.00 | Coating agent-10 |
| Example 23 | | | 0.00 | 68.74 | | | 9.04 | 98.97 | Synthesis-7 | 75.36 | 101.44 | | | 3.00 | Coating agent-11 |
| Example 24 | 11.56 | | | | 62.11 | | 11.34 | 91.87 | Synthesis-1 | 105.19 | | 71.61 | | 2.00 | Coating agent-12 |
| Example 25 | 11.56 | | | | 62.11 | | 11.34 | 91.87 | | 51.14 | | | 125.66 | 2.00 | Coating agent-13 |

TABLE 4

| | Surface layer | | | | Evaluation [6] Drum potential [−V] | | | | | Evaluation [7] | | | | | |
|---|---|---|---|---|---|---|---|---|---|---|---|---|---|---|---|
| | | | | | | | | | | LBP5050 | | LBP7200 | | Reconstructed apparatus of LBP7200 | |
| | Thickness | Evaluation | | | Process speed [mm/sec] | | | | Charging | Initial | After | Initial | After | Initial | After |
| | [nm] | [1] | [3] | [5] | 73.5 | 115.5 | 173.3 | ΔVd | ability | stage | endurance | stage | endurance | stage | endurance |
| Example 1 | 10 | A | B | B | 511 | 510.3 | 509.5 | 1.5 | AA | A | A | A | A | A | A |
| Example 2 | 30 | A | B | A | 510.7 | 509.4 | 508 | 2.7 | AA | A | A | A | A | A | A |
| Example 3 | 100 | A | B | A | 509.3 | 504.7 | 500 | 9.3 | C | A | A | B | C | C | C |
| Example 4 | 10 | A | B | B | 516.3 | 515.7 | 515 | 1.3 | AA | AA | AA | A | A | A | A |
| Example 5 | 30 | A | B | A | 516.2 | 515.2 | 514.2 | 2 | AA | AA | AA | A | A | A | A |
| Example 6 | 100 | A | B | A | 515.2 | 512.1 | 509 | 6.2 | B | A | A | A | A | B | C |
| Example 7 | 10 | B | B | B | 521.7 | 521.4 | 521 | 0.7 | AA | AA | AA | AA | AA | AA | AA |
| Example 8 | 30 | B | B | A | 521.6 | 521.2 | 520.8 | 0.8 | AA | AA | AA | AA | AA | AA | AA |
| Example 9 | 100 | B | B | A | 521.6 | 519.8 | 518.7 | 2.1 | AA | AA | AA | AA | AA | AA | AA |
| Example 10 | 5 | A | B | C | 505.2 | 504.9 | 504.5 | 0.7 | AA | B | B | B | B | B | B |
| Example 11 | 5 | A | B | C | 521.5 | 521 | 520.5 | 1 | AA | AA | AA | AA | AA | AA | AA |
| Example 12 | 5 | C | C | C | 521.7 | 521.5 | 521.2 | 0.5 | AA | AA | AA | AA | AA | AA | AA |
| Example 13 | 30 | A | B | A | 504.5 | 503.3 | 502 | 2.5 | AA | B | B | B | B | B | B |
| Example 14 | 30 | C | C | A | 521.6 | 521.2 | 520.8 | 0.8 | AA | AA | AA | AA | AA | AA | AA |
| Example 15 | 120 | A | C | A | 502.7 | 495.9 | 489 | 13.7 | C | B | B | B | C | C | C |
| Example 16 | 120 | A | C | A | 520.2 | 517.6 | 515 | 5.2 | B | AA | AA | AA | AA | A | B |
| Example 17 | 120 | C | C | A | 520.6 | 519.1 | 517.5 | 3.1 | A | AA | AA | AA | AA | A | A |
| Example 18 | 50 | A | B | A | 521 | 520.1 | 519.2 | 1.8 | AA | AA | AA | AA | AA | AA | AA |

TABLE 4-continued

| | Surface layer | | | | Evaluation [6] Drum potential [−V] | | | | | Charging ability | Evaluation [7] | | | | | |
|---|---|---|---|---|---|---|---|---|---|---|---|---|---|---|---|---|
| | | | | | | | | | | | LBP5050 | | LBP7200 | | Reconstructed apparatus of LBP7200 | |
| | Thickness | Evaluation | | | Process speed [mm/sec] | | | | | | Initial | After | Initial | After | Initial | After |
| | [nm] | [1] | [3] | [5] | 73.5 | 115.5 | 173.3 | ΔVd | | | stage | endurance | stage | endurance | stage | endurance |
| Example 19 | 50 | A | B | A | 521.2 | 520.6 | 520 | 1.2 | | AA | AA | AA | AA | AA | AA | AA |
| Example 20 | 50 | A | B | A | 521.2 | 520.6 | 520 | 1.2 | | AA | AA | AA | AA | AA | AA | AA |
| Example 21 | 50 | A | B | A | 521.2 | 520.6 | 520 | 1.2 | | AA | AA | AA | AA | AA | AA | AA |
| Example 22 | 50 | A | B | A | 523.6 | 523.3 | 522.9 | 0.7 | | AA | AA | AA | AA | AA | AA | AA |
| Example 23 | 50 | A | B | A | 517.3 | 516.3 | 515.2 | 2.1 | | AA | AA | AA | AA | AA | AA | AA |
| Example 24 | 50 | A | B | A | 520.5 | 519.4 | 518.3 | 2.2 | | AA | AA | AA | AA | AA | AA | AA |
| Example 25 | 50 | A | B | A | 518.4 | 516.9 | 515.3 | 3.1 | | A | AA | AA | AA | AA | AA | A |

TABLE 5

| Notation | Name | Structure | Manufacturer |
|---|---|---|---|
| EP-1 | 3-Glycidoxypropyltrimethoxysilane | $\underset{\triangle}{O}-(CH_2)-O-(CH_2)_3-Si(OMe)_3$ | Shin-Etsu Chemical Co., Ltd. |
| EP-2 | 4-(Trimethoxysilyl)-butane-1,2-epoxide | $\underset{\triangle}{O}-(CH_2)_2-Si(OMe)_3$ | Carbone Scientific |
| EP-3 | 8-Oxirane-2-yloctyltriethoxysilane | $\underset{\triangle}{O}-(CH_2)_8-Si(OEt)_3$ | SiKEMIA |
| EP-4 | 2-(3,4-epoxycyclohexyl)-ethyltrimethoxysilane | 3,4-epoxycyclohexyl-$(CH_2)_2-Si(OMe)_3$ | Shin-Etsu Chemical Co., Ltd. |
| He | Hexyltrimethoxysilane | $H_3C-(CH_2)_5-Si(OMe)_3$ | Shin-Etsu Chemical Co., Ltd. |
| Ph | Phenyltriethoxysilane | $C_6H_5-Si(OEt)_3$ | Shin-Etsu Chemical Co., Ltd. |
| Ti-1 | Titanium i-propoxide | $Ti-(OiPr)_4$ | Kojundo Chemical Laboratory Co., Ltd. |
| Ti-2 | Titanium methoxide | $Ti-(OMe)_4$ | Gelest |
| Ti-3 | Titanium nonyloxide | $Ti-(OC_9H_{19})_4$ | Gelest |

TABLE 6

| | Ti-1 | Water | EtOH |
|---|---|---|---|
| Synthesis-8 | 88.10 | 0.84 | 120.66 |

TABLE 7

| | Surface layer | | | | Evaluation [6] Drum potential [−V] | | | | Charging ability | Evaluation [7] | | | | | |
|---|---|---|---|---|---|---|---|---|---|---|---|---|---|---|---|
| | | | | | | | | | | LBP5050 | | LBP7200 | | LBP7200 | |
| | Thickness | Evaluation | | | Process speed [mm/sec] | | | | | Initial | After | Initial | After | Initial | After |
| | [nm] | [1] | [3] | [5] | 73.5 | 115.5 | 173.3 | ΔVd | | stage | endurance | stage | endurance | stage | endurance |
| Comparative Example 1 | 10 | A | B | D | 495.0 | 487.0 | 479.0 | 16.0 | D | C | D | C | D | D | E |
| Comparative Example 2 | 30 | A | B | C | 494.5 | 480.8 | 467.0 | 27.5 | D | C | D | D | E | E | E |

TABLE 7-continued

| | Surface layer | | | | Evaluation [6] | | | | Evaluation [7] | | | | | |
| | | | | | Drum potential [−V] | | | | LBP5050 | | LBP7200 | | LBP7200 | |
| | Thickness | Evaluation | | | Process speed [mm/sec] | | | Charging | Initial | After | Initial | After | Initial | After |
| | [nm] | [1] | [3] | [5] | 73.5 | 115.5 | 173.3 | ΔVd | ability | stage | endurance | stage | endurance | stage | endurance |
|---|---|---|---|---|---|---|---|---|---|---|---|---|---|---|---|
| Comparative Example 3 | 100 | A | B | C | 493.0 | 480.0 | 467.0 | 26.0 | D | C | D | D | E | E | E |
| Comparative Example 4 | — | — | — | — | — | — | — | — | — | — | — | — | — | — | — |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-298922, filed Dec. 28, 2009, which is hereby incorporated by reference herein in its entirety.

What is claimed is:

1. A charging member, comprising:
   a substrate;
   an elastic layer; and
   a surface layer,
   wherein:
   the surface layer contains a polymer having a Si-O-Ti bond; and
   the polymer has a constitutional unit represented by the following general formula (1) and a constitutional unit represented by the following general formula (2):

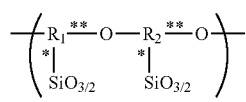

General formula (1)

$TiO_{4/2}$

General formula (2)

where $R_1$ and $R_2$ each independently represent any one of the following general formulae (3) to (6):

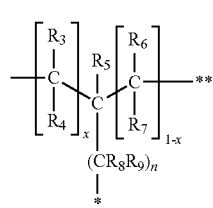

General formula (3)

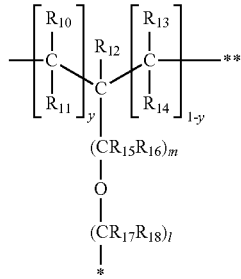

General formula (4)

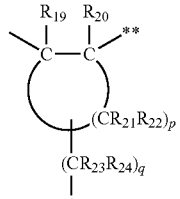

General formula (5)

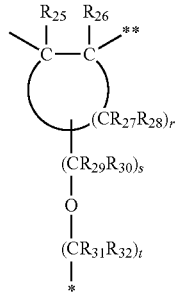

General formula (6)

where:
$R_3$ to $R_7$, $R_{10}$ to $R_{14}$, $R_{19}$, $R_{20}$, $R_{25}$, and $R_{26}$ each independently represent hydrogen, an alkyl group having 1 to 4 carbon atoms, a hydroxyl group, a carboxyl group, or an amino group;

$R_8$, $R_9$, $R_{15}$ to $R_{18}$, $R_{23}$, $R_{24}$, and $R_{29}$ to $R_{32}$ each independently represent hydrogen or an alkyl group having 1 to 4 carbon atoms;

$R_{21}$, $R_{22}$, $R_{27}$, and $R_{28}$ each independently represent hydrogen, an alkoxy group having 1 to 4 carbon atoms, or an alkyl group having 1 to 4 carbon atoms;

n, m, l, q, s, and t each independently represent an integer of 1 or more and 8 or less;

p and r each independently represent an integer of 4 or more and 12 or less;

x and y each independently represent 0 or 1; and

* and ** represent bonding positions with a silicon atom and an oxygen atom in the general formula (1), respectively.

2. The charging member according to claim 1, wherein $R_1$ and $R_2$ of the general formula (1) each independently represent any one selected from structures represented by the following general formulae (7) to (10):

General formula (7)

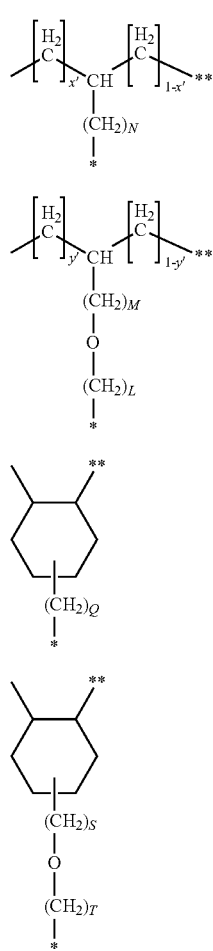

General formula (8)

General formula (9)

General formula (10)

where:
N, M, L, Q, S, and T each independently represent an integer of 1 or more and 8 or less;
x' and y' each independently represent 0 or 1; and
* and ** represent bonding positions with a silicon atom and an oxygen atom of the general formula (1), respectively.

3. The charging member according to claim 1, wherein a ratio (Ti/Si) of the number of titanium atoms to the number of silicon atoms in the polymer is 0.1 or more and 5.0 or less.

4. The charging member according to claim 1, wherein the polymer comprises a crosslinked product of a condensate of a hydrolyzable compound having a structure represented by the following general formula (11) and a hydrolyzable compound represented by the following general formula (12):

General formula (11)

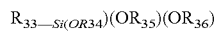

$R_{33}$—Si($OR_{34}$)($OR_{35}$)($OR_{36}$)

General formula (12)

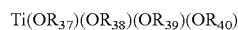

Ti($OR_{37}$)($OR_{38}$)($OR_{39}$)($OR_{40}$)

where $R_{33}$ represents any one of the following general formulae (13) to (16), $R_{34}$ to $R_{36}$ each independently represent an alkyl group having 1 to 4 carbon atoms, and $R_{37}$ to $R_{40}$ each independently represent an alkyl group having 1 to 9 carbon atoms:

General formula (13)

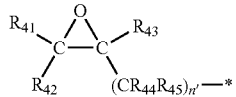

General formula (14)

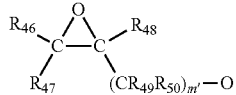

General formula (15)

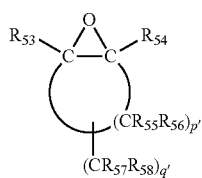

General formula (16)

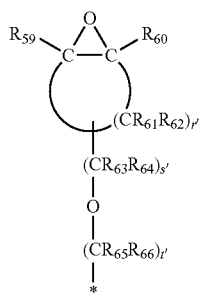

where:
$R_{41}$ to $R_{43}$, $R_{46}$ to $R_{48}$, $R_{53}$, $R_{54}$, $R_{59}$, and $R_{60}$ each independently represent hydrogen, an alkyl group having 1 to 4 carbon atoms, a hydroxyl group, a carboxyl group, or an amino group;
$R_{44}$, $R_{45}$, $R_{49}$ to $R_{52}$, $R_{57}$, $R_{58}$, and $R_{63}$ to $R_{66}$ each independently represent hydrogen or an alkyl group having 1 to 4 carbon atoms;
$R_{55}$, $R_{56}$, $R_{61}$, and $R_{62}$ each independently represent hydrogen, an alkoxy group having 1 to 4 carbon atoms, or an alkyl group having 1 to 4 carbon atoms;
n', m', l', q', s', and t' each independently represent an integer of 1 or more and 8 or less;
p' and r' each independently represent an integer of 4 or more and 12 or less; and
* represents a bonding position with a silicon atom in the general formula (11).

5. The charging member according to claim 1, wherein the polymer comprises a crosslinked product of a condensate of hydrolyzable compounds represented by the general formulae (11) and (12), and a hydrolyzable compound represented by the following general formula (17):

General formula (17)

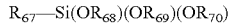

$R_{67}$—Si($OR_{68}$)($OR_{69}$)($OR_{70}$)

where $R_{67}$ represents an alkyl group having 1 to 4 carbon atoms or a phenyl group, and $R_{68}$ to $R_{70}$ each independently represent an alkyl group having 1 to 6 carbon atoms.

6. An electrophotographic apparatus, comprising:
an electrophotographic photosensitive member; and
the charging member according to claim 1 placed to contact the electrophotographic photosensitive member.

7. A process cartridge, comprising:
an electrophotographic photosensitive member; and
the charging member according to claim 1 placed to contact the electrophotographic photosensitive member,
wherein the process cartridge is formed to be detachable from a main body of an electrophotographic apparatus.

* * * * *